United States Patent Office 3,450,181
Patented June 17, 1969

3,450,181
APPARATUS FOR COMMINUTING MEAT
OR THE LIKE
Fritz Otto, Hameln, Germany, assignor, by mesne assignments, to Belder Trust, Reg., Vaduz, Liechtenstein
Filed Nov. 3, 1966, Ser. No. 591,884
Claims priority, application Germany, Nov. 25, 1965,
St 24,687
Int. Cl. A22c 5/00
U.S. Cl. 146—192          9 Claims

ABSTRACT OF THE DISCLOSURE

An apparatus for comminuting materials has a housing provided with a bottom wall. A drive shaft extends through the bottom wall into the interior of the housing. A rotary cutter overlies the bottom wall to define therewith a narrow gap. A quick-release coupling couples the output shaft of the rotary drive with the cutting member so that the latter may be readily removed from the interior of the housing to gain access to material which has accumulated in the gap.

---

Figure 1:
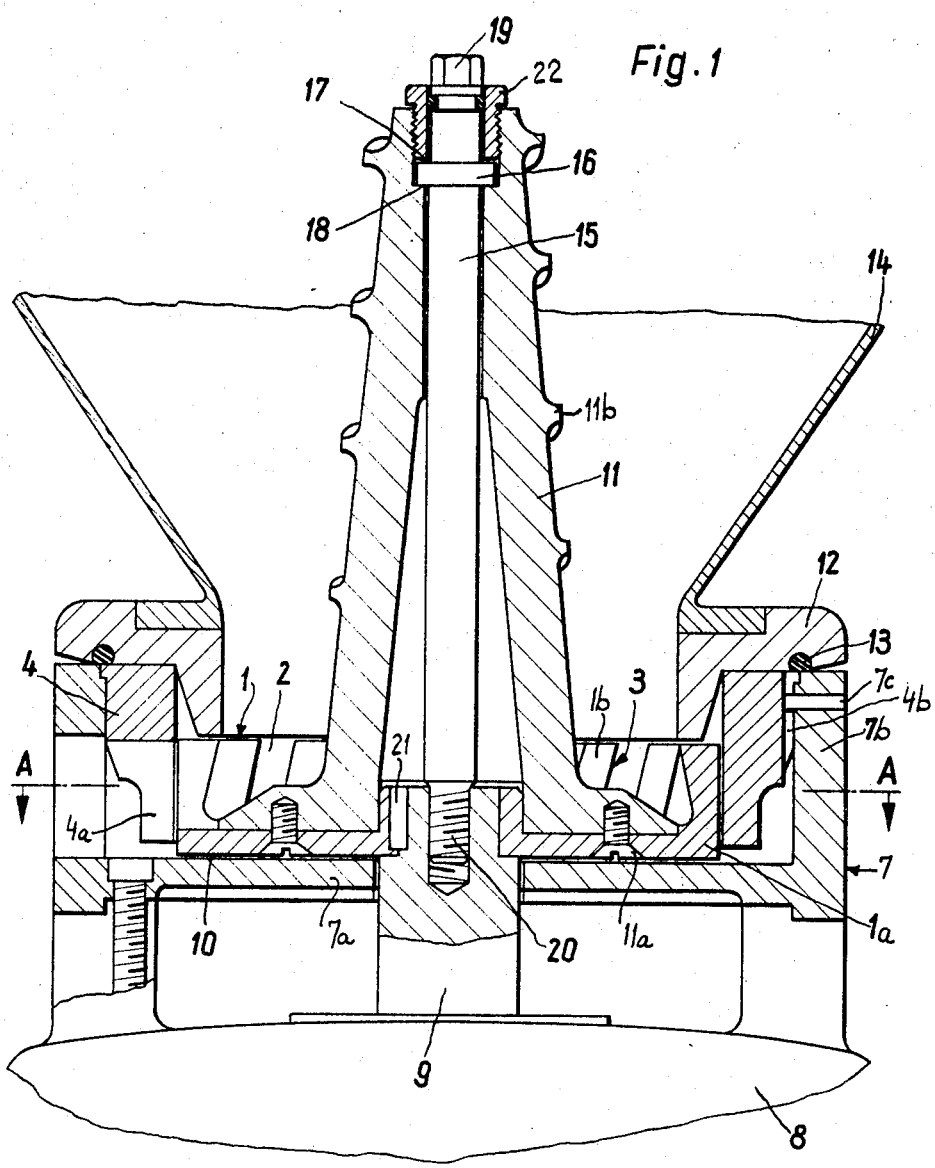

The present invention relates to apparatus for comminuting raw or cooked meat, other types of foodstuffs and analogous substances. More particularly, the invention relates to improvements in comminuting apparatus of the type wherein a rotary cutting member is driven by the output shaft of an electric motor and carries a set of annularly arranged comminuting teeth which are rotated within and with reference to an annulus of stationary comminuting teeth. Such apparatus must be cleaned, inspected and/or repaired at frequent intervals and, therefore, accessibility of parts which come in actual contact with meat or other perishable substances is of utmost importance to reduce the time for dismantling and reassembly to a minimum. The rotary cutting member defines with the housing of the comminuting apparatus a relatively narrow gap which is often filled with particles of comminuted material and must be cleaned by water, steam or other suitable washing fluid. In many presently known comminuting apparatus of the above outlined character, the gap is accessible only in response to complete dismantling which might induce a lazy or irresponsible workman to skip the required washing operation upon completion of a comminuting operation or to carry out an unsatisfactory washing job. Also, the washing operation consumes much time, which is particularly undesirable if a material of different consistency is to be introduced into the apparatus immediately upon completion of the preceding comminuting operation.

Accordingly, it is an important object of the present invention to provide a comminuting apparatus for meat or the like wherein the rotary cutting or comminuting remaining parts of the apparatus with little loss in time, by resorting to rudimentary tools, by exertion of a small effort, and in such a way that, upon separation of the rotary cutting member, all parts which come in actual contact with the processed material are fully exposed for inspection, replacement and/or cleaning.

Another object of the invention is to provide a comminuting apparatus of the just outlined characteristics wherein the two cutting members can be exposed in a time-saving operation to facilitate sharpening of their cutting edges.

A further object of my invention is to provide a novel connection between the rotary cutting member and its drive.

An additional object of the invention is to provide a novel material feeding device which may be utilized in an apparatus of the above outlined characteristics to urge meat or other material to be comminuted into the range of cutting edges on the cutting members.

A concomitant object of the invention is to provide a feeding device which forms part of the connection between the drive and the rotary cutting member.

Briefly stated, one feature of my invention resides in the provision of an apparatus which may be utilized to comminute raw or cooked meat or other foodstuffs. The apparatus comprises a housing having a wall which is preferably disposed in a horizontal plane, a drive having a rotary output shaft extending with some clearance through and beyond the wall of the housing, a rotary cutting member adjacent to the upper side of the wall, and a quick-release coupling provided between the output shaft and the cutting member. Such quick-release coupling comprises means for holding the cutting member against axial and angular movement with reference to the output shaft.

In accordance with a more specific feature of the present invention, the quick-release coupling may include a hollow tubular feed screw which is screwed, bolted or otherwise affixed to the cutting member and extends in a direction away from the aforementioned wall, a spindle which is received in the feed screw and has one of its end portions exposed so that it may be engaged by a tool to facilitate its rotation with reference to the output shaft, and stop means for holding the spindle against axial movement with reference to the feed screw and cutting member. The other end portion of the spindle meshes with the output shaft so that, by the simple expedient of unscrewing the spindle, the operator can uncouple the cutting member from the output shaft.

The stop means may include an annular collar on the spindle and two shoulders provided on the feed screw. One of these shoulders may be moved axially to permit for insertion or removal of the spindle from the axial passage in the feed screw.

Figure 2:
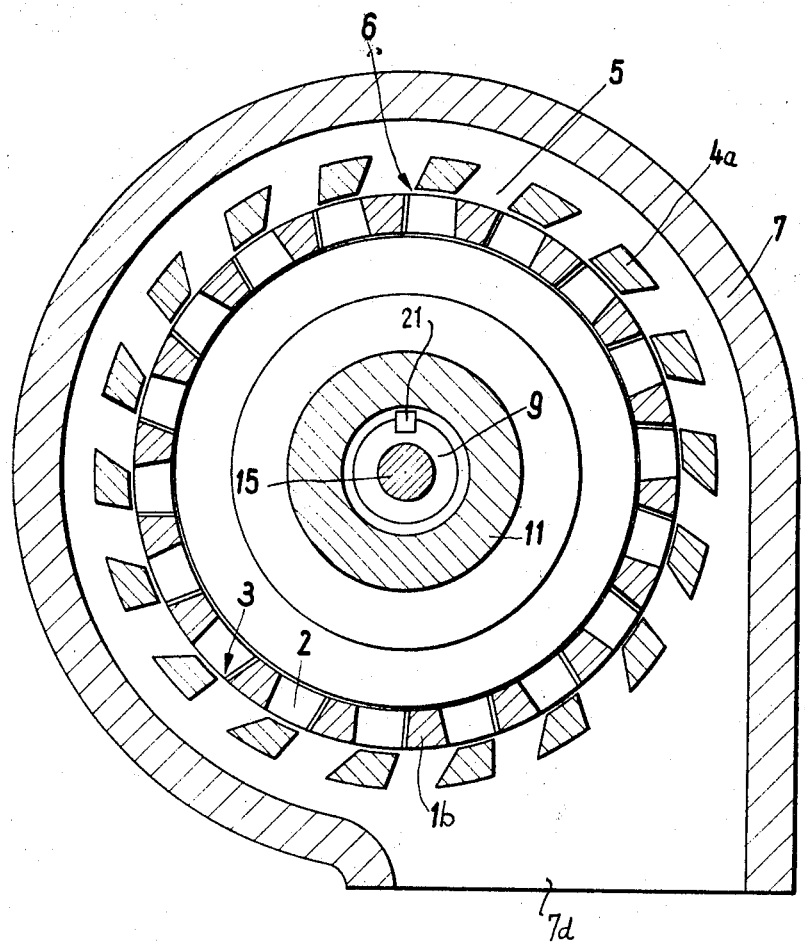

The novel features which are considered as characteristic of the invention are set forth in particular in the appended claims. The improved comminuting apparatus itself, however, both as to its construction and its mode of operation, together with additional features and advantages thereof, will be best understood upon perusal of the following detailed description of a specific embodiment with reference to the accompanying drawings, in which:

FIG. 1 is a fragmentary axial section through a comminuting apparatus which embodies my invention; and FIG. 2 is a horizontal section as seen in the direction of arrows from the line A—A of FIG. 1.

Referring to the drawings in detail, there is shown a comminuting apparatus which comprises a substantially cylindrical housing 7 mounted on the casing of an electric drive motor 8 having an upwardly extending output shaft 9 which passes with small clearance through and beyond a horizontal wall 7a of the housing. The upper end portion of the output shaft 9 is coupled in a novel way with the disk-shaped platform 1a of a cupped rotary cutting member 1 having an annulus of teeth 1b extending upwardly from the marginal portion of the platform 1a and defining between themselves slots 2 through which comminuted material can pass radially outwardly. The teeth 1b are provided with cutting edges 3 which cooperate with cutting edges 6 provided on the annularly arranged teeth 4a of a stationary second cutting member 4. The teeth 4a surround the teeth 1b and are separated from each other by tooth spaces 5. The cutting edges 3 and 6 may be parallel with or inclined with reference to the axis of the output shaft 9. The stationary cutting member 4 has an axially extending peripheral groove 4b which receives a pin 7c extending radially inwardly from a cylindrical wall 7b of the housing 7 to hold the member 4 against rotation. Axial movements of the cutting member 4 are prevented by a ring-shaped retainer 12 which is affixed to the wall 7b and overlies the top face of the cutting member 4. An annular gasket 13 of rubber or like elastomeric material is interposed between the cutting member 4 and retainer 12. The latter carries a hopper 14.

The platform 1a defines with the top surface of the wall 7a a narrow gap 10 which is likely to accumulate particles of comminuted material and must be cleaned at frequent intervals. In accordance with my invention, the gap 10 is readily accessible upon separation of the hopper 14 and retainer 12 and upon subsequent separation of the cutting member 1 from the output shaft 9. The parts 1 and 9 are connected to each other by a quick-release coupling which includes a tubular feed screw 11 and a spindle 15, the latter extending through the axial passage of the feed screw. This feed screw is coaxially secured to the platform 1a by screws 11a or similar threaded fasteners and extends in a direction away from the wall 7a. As clearly shown in FIG. 1, the feed screw 11 tapers in a direction away from the platform 1a and is provided with an external helical thread 11b which compels material admitted into the hopper 14 to advance toward the upper side of the platform 1a and to be moved radially outwardly by centrifugal force to pass between the cutting edges 3, 6 and into an outlet 7d of the housing 7. The inner end portion 20 of the spindle 15 is provided with external threads which mesh with internal threads provided in a tapped bore machined into the top face of the output shaft 9. The other or upper end portion 19 of the spindle 15 is exposed and is preferably of non-circular (for example, hexagonal) outline to be readily engaged by a wrench or other simple tool. A key 21 extends into registering axially parallel grooves of the platform 1a and output shaft 9 to hold the latter against rotation with reference to the cutting member 1.

The aforementioned quick-release coupling further comprises means to hold the spindle 15 against axial movement with reference to the feed screw 11 but to permit rotation of the spindle with reference to the parts 1, 9 and 11. Such means includes an annular collar or boss 16 on the spindle 15 and two stop shoulders 17, 18 provided on the feed screw 11 and located at the opposite axial ends of the collar 16. The shoulder 18 is machined into the feed screw but the shoulder 17 is provided on a small externally threaded plug 22 which is screwed into the feed screw and is removed if the spindle 15 is to be separated from the feed screw.

By the simple expedient of rotating the outer end portion or head 19 of the spindle 15, an operator can unscrew the end portion 20 and can lift the cutting member 1 off the output shaft 9. Such uncoupling of the cutting member 1 will be carried out upon separation of the retainer 12 and hopper 14 from the housing 7. The surfaces bounding the aforementioned gap 10 are accessible upon uncoupling of the cutting member 1. The reassembly of the apparatus is equally simple, i.e., the spindle 15 is brought into mesh with the output shaft 9 in a first step and the parts 12, 14 are reattached to the housing 7 in the next-following step.

The feed screw 11 and the cutting member 1 can be cleaned with requisite thoroughness in response to uncoupling from the output shaft 9, and the same holds true for the stationary cutting member 4 which can be lifted out of the cylindrical wall 7b as soon as the retainer 12 is removed. The cutting edges 3 and 6 can be sharpened upon removal of the respective cutting members.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. In an apparatus for comminuting meat or the like, a housing having a bottom wall; a drive having a rotary output shaft extending through said bottom wall into the interior of said housing; a rotary cutting member overlying said bottom wall defining therewith a narrow gap; and a quick-release coupling for said output shaft and said cutting member, said coupling comprising a tubular member fixed coaxially to said cutting member extending away from said bottom wall and having a free end portion, and a spindle extending through said tubular member and having a first end portion threadedly connected with said output shaft and a second end portion threadedly connected with said free end portion of said tubular member, whereby said cutting member may be released from connection with said drive shaft for removal of matter accumulated in said gap in response to disconnection of said tubular member and said spindle.

2. A structure as set forth in claim 1, wherein said exposed end portion of the spindle is of other than circular outline so that it can be engaged by a tool to facilitate its connection with or separation from said output shaft.

3. A structure as set forth in claim 1, wherein said tubular member is provided with an external helical thread to feed material toward said cutting member in response to rotation of said output shaft.

4. A structure as set forth in claim 1, wherein said coupling means further comprises means for holding said cutting member against rotation with reference to said output shaft.

5. A structure as set forth in claim 1, wherein said cutting member comprises an annulus of teeth extending in a direction away from said wall and further comprising a second cutting member fixed to said housing and having an annulus of teeth surrounding said first mentioned annulus.

6. A structure as set forth in claim 5, wherein said rotary cutting member further comprises a platform which is adjacent to and defines with said wall an annular gap, said quick-release coupling comprising a tubular feed screw coaxially affixed to said platform opposite said wall and arranged to feed material to be comminuted toward said platform in response to rotation of said output shaft, a spindle received in said feed screw and having a first end portion meshing with said output shaft and an exposed second end portion, and stop means provided on said feed screw and said spindle for rotatably holding the latter against axial movement with reference to the feed screw, so that, when said first end portion of the spindle is separated from said output shaft, the coupling between such shaft and said rotary cutting member is disengaged.

7. A structure as set forth in claim 6, wherein said stop means comprises a collar provided on said spindle and shoulders provided on said feed screw at the opposite axial ends of said collar.

8. A structure as set forth in claim 6, wherein said output shaft is substantially vertical and said gap is adjacent to the upper side of said wall.

9. A structure as set forth in claim 6, further comprising a hopper affixed to said housing and surrounding said feed screw, said feed screw tapering in a direction away from said platform.

References Cited

UNITED STATES PATENTS

| | | | |
|---|---|---|---|
| 2,894,551 | 7/1959 | Otto | 146—192 X |
| 3,369,583 | 2/1968 | Schnell | 146—192 |

FOREIGN PATENTS

| | | |
|---|---|---|
| 405,225 | 10/1924 | Germany. |
| 1,014,764 | 6/1952 | France. |

W. GRAYDON ABERCROMBIE, *Primary Examiner.*

U.S. Cl. X.R.

146—68